United States Patent

Mushovic

[11] Patent Number: 5,508,315
[45] Date of Patent: Apr. 16, 1996

[54] CURED UNSATURATED POLYESTER-POLYURETHANE HYBRID HIGHLY FILLED RESIN FOAMS

[75] Inventor: John N. Mushovic, The Plains, Va.

[73] Assignee: Ecomat, Inc., Chantilly, Va.

[21] Appl. No.: 348,973

[22] Filed: Nov. 28, 1994

Related U.S. Application Data

[63] Continuation of Ser. No. 224,775, Apr. 8, 1994, Pat. No. 5,369,147, which is a continuation-in-part of Ser. No. 961,332, Oct. 15, 1992, Pat. No. 5,302,634.

[51] Int. Cl.$^6$ .................................................. C08G 18/42
[52] U.S. Cl. ..................... 521/122; 521/123; 521/137; 521/172; 521/173; 523/218; 523/219
[58] Field of Search .................................. 523/218, 219; 521/122, 123, 137, 173, 172

[56] References Cited

U.S. PATENT DOCUMENTS

| | | |
|---|---|---|
| 3,008,917 | 11/1961 | Park et al. . |
| 3,585,155 | 6/1971 | Hollstein et al. . |
| 3,697,456 | 10/1972 | Pitts et al. . |
| 3,723,370 | 3/1973 | Watanabe et al. . |
| 3,824,201 | 7/1974 | McGranaghan et al. . |
| 3,830,776 | 8/1974 | Carlson et al. . |
| 3,867,159 | 2/1975 | Ergene . |
| 3,960,785 | 6/1976 | Babcock . |
| 4,111,713 | 9/1978 | Beck . |
| 4,152,368 | 5/1979 | Dorfman et al. . |
| 4,169,824 | 10/1979 | Kane . |
| 4,195,014 | 3/1980 | Dorfman et al. . |
| 4,210,457 | 7/1980 | Dodson et al. . |
| 4,212,953 | 7/1980 | Sheratte et al. . |
| 4,216,294 | 8/1980 | Halle et al. . |
| 4,216,308 | 8/1980 | Rigge et al. . |
| 4,287,116 | 9/1981 | Burns . |
| 4,302,553 | 11/1981 | Frisch et al. . |
| 4,331,726 | 5/1982 | Cleary . |
| 4,394,491 | 7/1983 | Hoffman . |
| 4,409,344 | 11/1983 | Moulson et al. . |
| 4,661,533 | 4/1987 | Stobby . |
| 4,694,051 | 9/1987 | Kordomenos et al. . |
| 4,714,722 | 12/1987 | Najvar et al. . |
| 4,725,632 | 2/1988 | Vess . |
| 4,737,524 | 4/1988 | Ako et al. . |
| 4,740,406 | 4/1988 | Narumiya et al. . |
| 4,777,189 | 10/1988 | Shimomura et al. . |
| 4,777,208 | 10/1988 | Hefner, Jr. . |
| 4,816,503 | 3/1989 | Cunningham et al. . |
| 4,822,849 | 4/1989 | Vanderlaan . |
| 4,892,919 | 1/1990 | Leitheiser et al. . |
| 4,902,773 | 2/1990 | Bodnar et al. . |
| 4,923,934 | 5/1990 | Werner . |
| 4,929,667 | 5/1990 | Ban et al. . |
| 4,931,376 | 5/1990 | Ikematsu et al. . |
| 4,937,273 | 6/1990 | Okuyama et al. . |
| 4,946,876 | 8/1990 | Carpenter et al. . |
| 4,952,365 | 8/1990 | Shibuya et al. . |
| 5,079,383 | 1/1992 | Matsunaga et al. . |
| 5,086,084 | 2/1992 | Michaelson . |
| 5,093,378 | 3/1992 | Ishiwaka et al. . |
| 5,096,640 | 3/1992 | Brody et al. . |
| 5,098,950 | 3/1992 | Kagaya et al. . |
| 5,369,147 | 11/1994 | Mushovic .............................. 523/219 |

OTHER PUBLICATIONS

Edwards, "The Application of Isophthalic Unsaturated . . . ", 42nd Annual Conference Composite Institute, Feb. 2–6, 1987, pp. 1–6, Session 8–C, The Society of the Plastics Industry Inc.
"Interpol 5124", Cook Composites and Chemicals, Inc.
"Interpol 5116", Cook Composites and Chemicals, Inc.
Aluminum Company of America, Material Safety Data Sheet for "Red Mud".
Newsfocus, Industry and Newsfocus, Technology Plastics Technology, Dec. 1992, pp. 14 and 74.
American Electric Power Service Corporation National Safety Data Sheet (Fly Ash).
K. Ashida, Polyisocyanurate Foams, Preparation of Modified Polyisocyanurate Foams, vol. 6, pp. 112–124.
F. A. Shutov, Hollow Sphere Fillers, Syntactic Polymer Foams, vol. 16, pp. 356–359.
Sample Resin Formulations, Formulating Hybrid Resin Molding Compounds, Formulating Hydroxyl—Terminated Unsaturated Isopolyesters, What are Hybrid Resins?

*Primary Examiner*—Morton Foelak
*Attorney, Agent, or Firm*—Birch, Stewart, Kolasch & Birch

[57] ABSTRACT

The present invention is directed to a rigid, lightweight filled resin foam having voids dispersed in a continuous phase which is formed from a polyester hybrid resin having reinforcing particles dispersed therein. The hybrid resin forms a complex crosslinked network which may interact with other polymer networks in the continuous phase either by crosslinking or by forming an interpenetrating polymer network. The present invention is also directed to a process for preparing the above rigid, lightweight resin foam, and to a composition for use in this process. The foam of the present invention is useful in building materials and the like requiring high tensile and compressive strength and corrosion and thermal resistance.

5 Claims, 4 Drawing Sheets

5,508,315

CURED UNSATURATED POLYESTER-POLYURETHANE HYBRID HIGHLY FILLED RESIN FOAMS

This application is a continuation of application Ser. No. 08/224,775, now U.S. Pat. No. 5,369,147 filed on Apr. 8, 1994 which is a continuation-in-part of Ser. No. 07/961,332, now U.S. Pat. No. 5,302,634 filed Oct. 15, 1992, the entire contents of which are hereby incorporated by reference.

BACKGROUND OF THE INVENTION

1. Field of the Invention

Foamed recyclables are molded, lightweight, two-polymer structured materials containing large amounts of industrial waste products. The physical properties of the cured products are excellent when compared to the properties of commercially available foams. The industrial waste products are fines, or must be converted to fines, prior to use in the foamed recyclable. The binder or glue that encapsulates each particle and forms the cellular walls of the foam is itself a unique, two-polymer thermoset that, when cured, allows maximum physical property attainment through polymer design.

Molded or processed foamed recyclables of the present invention are useful as, e.g., lightweight roofing materials (e.g., tiles or slates), decorative or architectural products, outdoor products, low cost insulation panels, fencing, lightweight, buoyant or corrosion-resistant marine products, etc.

2. Discussion of Related Art

Hybrid resins are known, and are described in Edwards, The Application Of Isophthalic Unsaturated Polyester Urethane Hybrids In Conventional Molding Techniques, 42nd Annual Conference Composites Institute, The Society Of The Plastics Industry, Inc., Feb. 2–6, (1987) (pp. 1–6, Session 8-C), U.S. Pat. No. 4,822,849, U.S. Pat. No. 4,892,919 and U.S. Pat. No. 5,086,084.

Interpenetrating polymer networks, or IPNs are also known. An IPN is a material which consists of a pair of networks, at least one of which has been synthesized and/or crosslinked in the presence of the other. An IPN can be described as an intimate mixture of two or more distinct crosslinked polymer networks that cannot be physically separated. Interpenetrating polymer networks can be classified into several categories. For example, when only one polymer is crosslinked and the other is linear, the product is called semi-IPN. U.S. Pat. No. 4,302,553 discloses two structurally different crosslinked polymers, which when combined, form an IPN structure. The IPN structure is comprised of the two different crosslinking polymers which are permanently entangled with one another and characterized in that no chemical interaction had occurred between the individual networks. Interpenetrating polymer networks are also described in U.S. Pat. No. 4,923,934 and U.S. Pat. No. 5,096,640.

Foamed and/or cured foams of polymer resins, which may contain inorganic fillers, are described in U.S. Pat. No. 2,642,403, U.S. Pat. No. 3,697,456, U.S. Pat. No. 4,331,726, U.S. Pat. No. 4,725,632, U.S. Pat. No. 4,777,208, U.S. Pat. No. 4,816,503, U.S. Pat. No. 4,216,294, U.S. Pat. No. 4,260,538, U.S. Pat. No. 4,694,051, and U.S. Pat. No. 4,946,876.

Despite this activity, the products produced by the prior art, especially products of lightweight construction materials, do not have sufficiently well-balanced properties with regard to structural strength, as well as with regard to corrosion and thermal resistance, and processing.

Preparation of foams of unsaturated polyesters useful in the manufacture of lightweight building materials has been attempted using a number of different techniques. However, a difficulty encountered in attempts to produce unsaturated polyester foams is the generation of gases so as to cause a uniform expansion of the resin at ambient temperatures before any appreciable crosslinking occurs. The present inventor has discovered that with a two polymer system, a significant portion of the crosslinking and curing does not have to occur immediately after the maximum amount of gases has been released. Indeed, upon completion of the first polymer reaction, the crosslinking reaction can be delayed for hours. However, should appreciable crosslinking occur before maximum gas release, the accompanying exothermic reaction will cause cracking as the previously unreleased gases are generated thereby causing stresses against a very rigid crosslinked structure which is unable to further expand. Moreover, should the polyurethane reaction have not occurred to a point sufficient to maintain the cell structures, the gases will gradually escape, and the expanded resin will drop back to its original state. The cured polymer will form much like a standard resin casting, with little or no expansion.

Lightweight cementitious compositions are known in which the desired weight reduction over concrete is achieved by the use of lightweight aggregate. However, articles made from such materials are brittle and possess tensile strengths which are low and limit many practical applications. Also, the density range of lightweight concretes is three times higher than the foam of the present invention.

Low density rigid polyurethane modified-polyisocyanurate foams have been widely used as insulative structural members. As with other polymeric materials, it is often desirable to reduce the polymer content and improve the properties of these members by the addition of inorganic fillers. Unfortunately, it has proven difficult to provide a rigid polyurethane or polyisocyanurate foam containing more than about 10% by weight of such fillers. These fillers tend to rupture the cells of the foam, which in turn dramatically reduces its insulative capacity. Another undesirable effect of high levels of fillers is that the foam becomes very friable. Since higher filler levels are desired, because they provide a less expensive material and certain physical property improvements, it would be highly desirable to provide a highly filled, rigid polyurethane-modified polyisocyanurate foam which has good insulative properties and low friability.

U.S. Pat. No. 4,661,533 relates to using a particular inorganic filler, namely fly ash, as the inorganic filler for filling rigid polyurethane modified-polyisocyanurate foams. High percentage additions of fly ash to very light weight (2 pounds per cubic foot (pcf)) insulating foam are described. The use of the fly ash inorganic filler enables the foam to be filled to a theoretical level of about 80% of the foam's total weight without deterioration of the insulative properties, friability and compressive strength. The foam is useful as board insulation, sheathing insulation, pipe insulation and the like. However, even though the foam of the above patent is highly filled with fly ash, the problems associated with the formation of two distinct polymers and hybrid resin technology where a very high percentage of the end product is crosslinkable as a cured polyester (up to 90%) did not have to be addressed. Additionally, the superior processing advantages inherent in the polyester/polyurethane chemistry are not possible with the prior art product. The potential physical properties obtainable from the filled foam of the present invention, having two distinct polymer systems, are much higher, and the ability to control individual reactions in the polyester/polyurethane system used in the present invention is considerably better than that possible with the single shot polyurethane/polyisocyanurate chemistry of the prior art.

SUMMARY OF THE INVENTION

An object of the present invention is to provide a low cost, rigid lightweight polymeric cementitious composition, which has the desirable physical and chemical properties, and processing flexibility of traditional structural building materials.

Another object of the present invention is to provide highly filled foamed thermosets having an overall improvement in structural strength, corrosion and thermal resistance, and related properties, and having excellent properties in the highly filled modification of the curable foamable composition.

Another object of the present invention is to provide a foamed building material which recycles and uses large quantities of industrial waste particulates, thereby providing a low cost building material, and decreasing disposal costs for these industrial waste materials.

A particular object of the present invention is to provide a novel unsaturated polyester polyurethane hybrid resin foam, which has a continuous phase having cellular voids dispersed therein, formed from a matrix comprising a complex crosslinked network of an unsaturated polyester polyurethane resin, and having dispersed therein fine multisize reinforcing particles at least a portion of which are capable of releasing a blowing agent during the formation of the polyester polyurethane resin network, thereby foaming the reaction mixture and allowing for the development of unique, high strength, highly-filled cell walls.

Another object of the present invention is to provide a process for preparing the above rigid, lightweight filled resin foam, the foaming reaction of which may be uniquely controlled, which can be used with conventional, low cost processing equipment.

Another object of the present invention is to provide a rigid, lightweight filled resin foam which can be effectively reinforced with mineral fillers, chopped glass, chopped polymer fiber, directional or nondirectional glass fabrics, steel, finely ground powdered rubber, and the like, which take advantage of one or both phases to provide this effective reinforcement.

These and other objects and advantages are obtained by the present invention by providing a rigid, lightweight filled resin foam, comprising:

(A) a continuous phase having cellular voids therein, wherein said continuous phase comprises a matrix formed from a complex crosslinked network comprising an unsaturated polyester polyurethane resin which is the reaction product of an unsaturated polyester polyol, a saturated polyol, a poly- or diisocyanate, and a reactive monomer, and optionally further comprising:

(1) polyurethane modified hybrid networks;

(2) networks of polymerization products of reactive monomers;

(3) networks of polymerization products of saturated polyester polyol and poly- or diisocyanates;

(4) other networks that may form during the formation of the polyester polyurethane resin; or (5) mixtures of the above networks; and (B) fine multisize reinforcing particles dispersed in said matrix of said continuous phase, wherein the diameter of the largest of said multisize particles is no greater than about 33% of the average thickness of said wall's between said cellular voids, and wherein at least a portion of said multisize particles are capable of containing and releasing a blowing agent during the formation of said polyester polyurethane resin.

The unsaturated polyester polyurethane resin may be at least partially crosslinked with a reactive monomer, or a poly- or diisocyanate, or both. The network formed by the polyester polyurethane may be entangled with the other networks described above (e.g., with a polyurethane network obtained by reaction of a poly- or diisocyanate with a saturated polyester polyol, or with a modified polyurethane hybrid resin obtained by reaction of a polyisocyanate, an unsaturated-polyester polyol, a saturated polyester polyol, and styrene monomer in the presence of a free radical initiator) to form an interpenetrating polymer network (IPN), or may be crosslinked with these networks. Regions of both IPN and crosslinking may occur in the same matrix. The continuous phase may also contain a flame retardant, such as a halogenated diol or polyol.

The fine multisize reinforcing particles may have a particle size distribution in the range of submicron particles to sizes as large as 200 microns, more particularly a range of 0.1 to 100 microns. The particles may be selected from the group consisting of treated red mud, aluminum hydrates, feldspars, clays, kaolinite, bentonite, beidellite, hydroxides, fly ash which has been preloaded with a blowing agent, diatomaceous earth, broken or cracked microballoons, broken or cracked microspheres, cenospheres separated from fly ash, Fullers earth, wood flour, cork dust, cotton flock, wool felt, shredded or finely powdered cornstalks, finely ground nut shells, and mixtures thereof.

The fine multisize reinforcing particles may be supplemented by mineral fillers, such as silicate, asbestos, calcium carbonate, mica, barytes, alumina, talc, carbon black, quartz, novaculite silica, garnet, saponite, calcium oxide, and mixtures thereof, or by chopped glass, chopped polymer fiber, directional or nondirectional glass fabrics, steel, finely ground powdered rubber, or mixtures thereof.

These objects are also obtained by providing a process for producing the rigid, lightweight filled resin foam above, comprising:

(A) forming a reaction mixture, comprising mixing unsaturated polyester polyol, a diisocyanate or polyisocyanate, a saturated polyol, a reactive monomer, and a free radical initiator, with fine multisize reinforcing particles, at least a portion of which contain a blowing agent and are capable of releasing said blowing agent to the reaction mixture;

(B) reacting, but not appreciably crosslinking, said reaction mixture;

(C) simultaneously with said reaction, foaming said reaction mixture in the presence of said blowing agent, to form a ductile, lightweight filled resin foam, wherein said blowing agent is released into the reaction system from said fine multisize reinforcing particles; and (D) hardening said ductile lightweight filled resin foam either immediately, or at a future time, by crosslinking to a rigid filled foam.

The saturated polyol may be a saturated polyester polyol, and organic diols or polyols may also be added to the reaction mixture in step (A) to help form additional polymer networks. Flame retardants, such as those described above, may also be added in step (A). Catalysts and surfactants may also be added in step (A).

The fine multisize reinforcing particles may contain a variety of blowing agents, selected from the groups consisting of water, trichloromono-fluoromethane, dibromodifluoromethane, dichlorodifluoromethane, dichlorotetrafluoroethane, monochlorodifluoromethane, trifluoroethylbromide, dichloromethane, methylene chloride, and mixtures thereof.

When the blowing agent is water, the fine multisize reinforcing particles may contain combined water by holding the water at different energy levels within the particles, combining the water with oxides to form a range of reactive hydroxides, trapping water in spongy, foamy cenospheres, containing water adsorbed on diverse carbon particles, or influencing water release by organic residues, polycyclic aromatic hydrocarbons, or polynuclear aromatic hydrocarbons.

These objects are also obtained by providing a composition for producing a rigid, lightweight filled resin foam comprising:
(A) an unsaturated polyester polyol
(B) a diisocyanate, polyisocyanate, or mixture thereof
(C) a reactive monomer
(D) a free radical initiator
(E) fine size reinforcing particles having a blowing agent entrained therein, and capable of releasing said blowing agent during a reaction forming a polyester polyurethane resin.

This reactive composition may also contain (F) a saturated polyester polyol, (G) a flame retardant or mixture thereof, (H) an organic diol or polyol, or mixture thereof, (I) a surfactant or mixture thereof, (J) a catalyst or mixture of catalysts, or (K) a coupling agent.

The reactive monomer may be selected from the group consisting of styrene monomers, vinyl monomers, and mixtures thereof. The free radical initiator may be selected from the group consisting of azoisobutyronitrile and an organic peroxide, such as benzoyl peroxide.

DETAILED DESCRIPTION OF THE INVENTION

FIGS. 1A, 1B, 2A, 2B, 3A, and 3B show general cases of possible resin, void, and filler combinations. The best properties of a filled foam structure will occur when the cell walls contain filler (12) and binder (13) such that the cell wall thickness is equal to at least three, preferably at least four, reinforcing particle diameters. Preferably the particles are spherical, so that the surface area to volume ratio is as high as possible, maximizing binder particle surface area contact, and avoiding stress riser points in the cell wall.

Figure 1B:
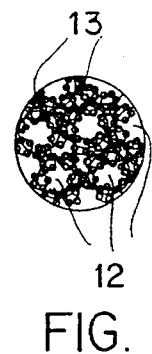
FIG. 1B is the magnified circled region of particles and binder.
Figure 1A:
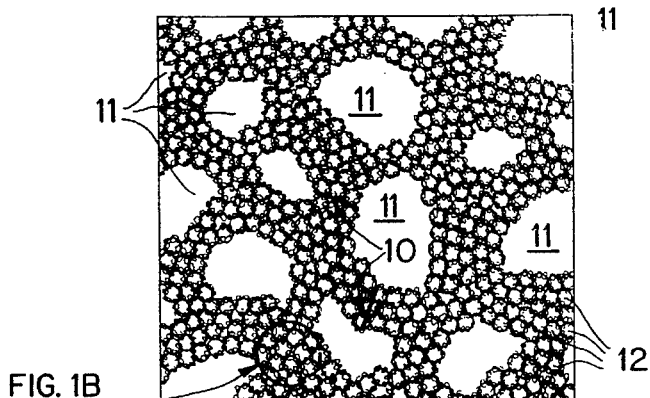
FIG. 1A illustrates a fragmentary sectional view of a cellular structure with particle diameters much smaller than the cell wall thickness, as in the present invention.

FIG. 1A shows a foamed structure where the cell walls (10) between the voids (11) are at least three particle (12) diameters thick.

Figure 2B:
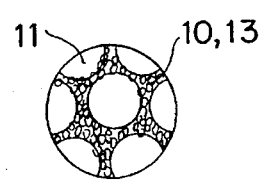
FIG. 2B is the magnified circled region of voids and pure polymer cell walls.
Figure 2A:
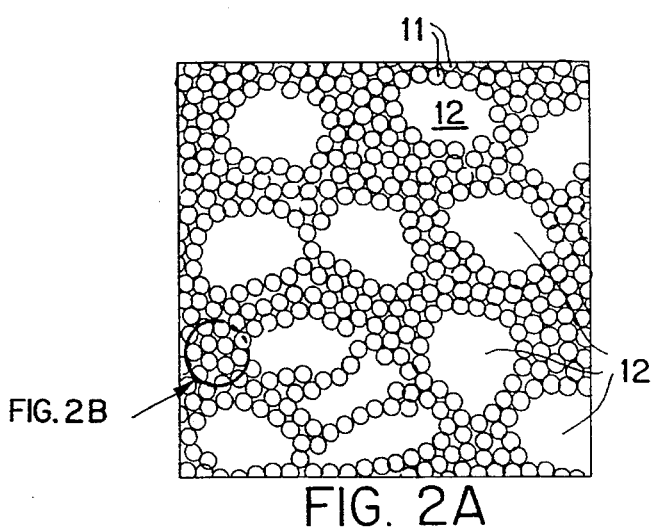
FIG. 2A illustrates a fragmentary sectional view of a cellular structure where the particle diameters are much larger than the cell wall thickness, and is not part of the present invention.

FIG. 2A shows a structure where the particles (12) are many times larger than the voids (11), and where there are no particles in the cell walls (10). The filler does not reinforce the cell walls, or beams (10), as in the case of FIG. 1. In FIG. 2A the large particles (12) are randomly dispersed in a matrix of pure polymer cell walls (10) and voids (11). The physical properties of the composite, including compressive and tensile strength, are equal to or less than those achieved with the pure, unfilled foam of the binder polymer. Other drawbacks to this structure include unfavorable shear plane orientations, gravity influenced particle distribution, shrinkage voids between filler particles, and long corrosion paths into the foamed structure.

Figure 3B:
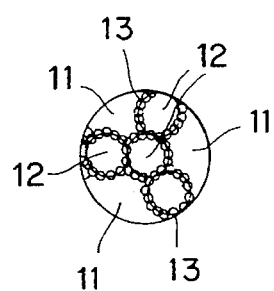
FIG. 3B is the magnified circled region showing voids, particles, and binder.
Figure 3A:
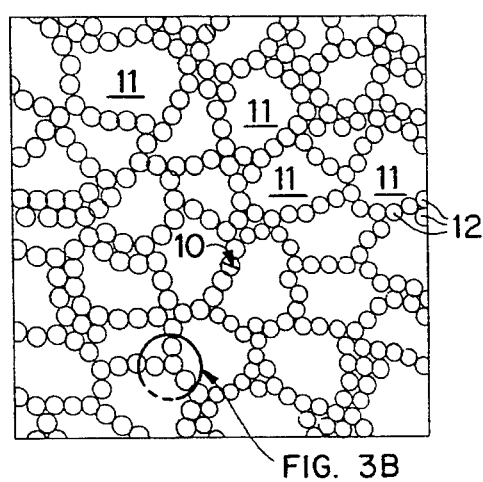
FIG. 3A illustrates a fragmentary sectional view of a cellular structure where the particle diameters are equivalent to the cell wall thickness, which is not part of the present invention.

FIG. 3A also represents a structure with physical properties well below those of the pure foam. In this case, the voids (11) have grown to the point where the thickness of the cell wall (10) is either one or two particle diameters thick. Again, the influence of the filler orientation results in thin separating walls, having low beam strengths, the tendency for more stress riser influence on the cell walls, etc. As a result, the physical properties, thermal insulating properties, and corrosion resistance are all low.

To obtain optimum properties in a foamed structure made up of particles and binder, Applicant has discovered that there is an optimum relationship between reinforcing particle size and shape, void size, wall thickness, and the wall thickness to particle diameter ratio. FIGS. 1B, 2B, and 3B schematically illustrate this.

Figure 4:
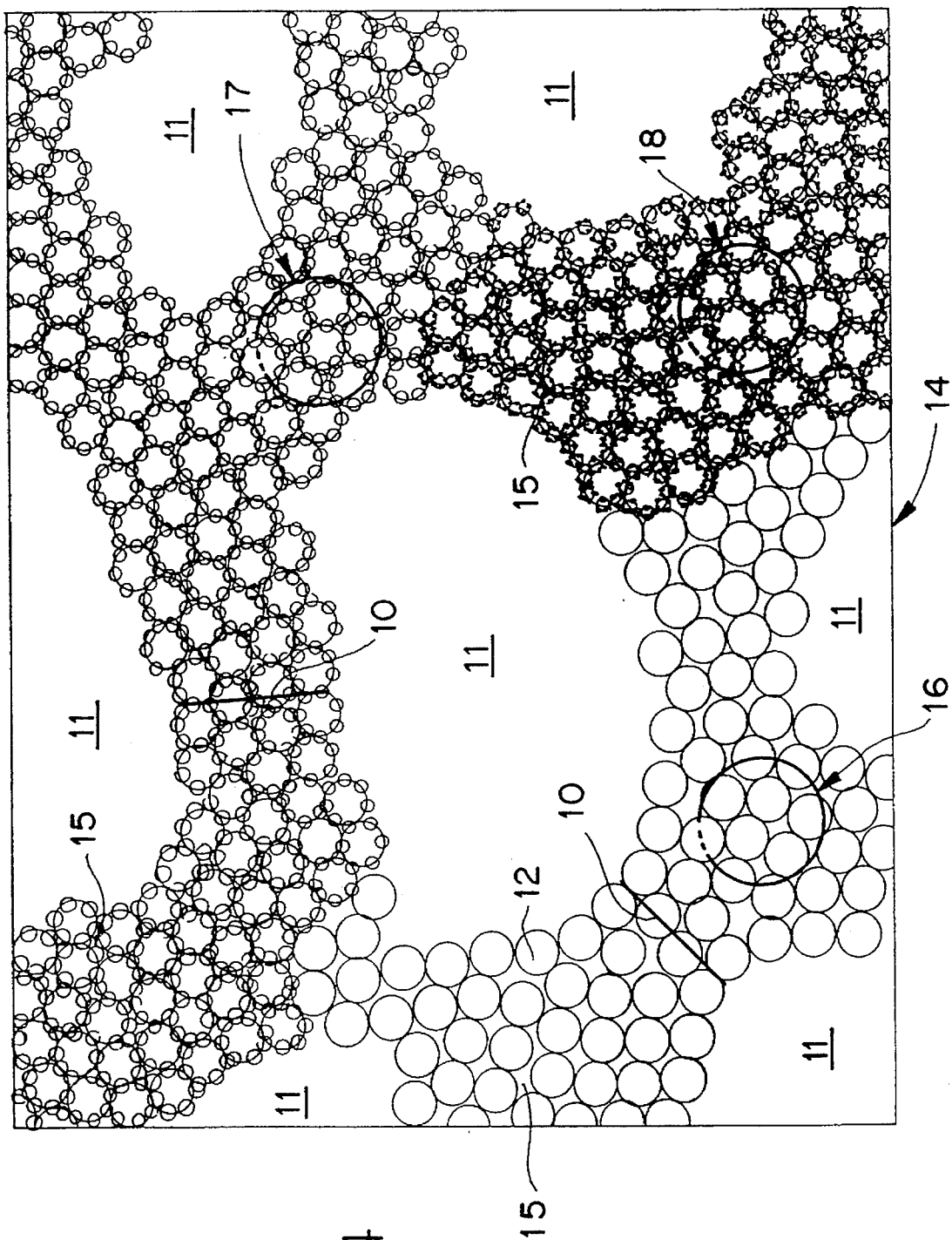
FIG. 4 illustrates a fragmentary sectional view of a cellular structure showing the progressive depletion of void space in the cell walls, obtained by mixing the optimal sizes and weight percents of each size of particle, according to the present invention. It also shows how the reinforcement level can be maximized and excellent beam strength in the cell wall can be maintained by the present invention.

FIG. 4 illustrates a highly magnified sectional view of a cellular structure (14) showing the progressive depletion of interparticle void space (15) in the cell walls (not desirable void as 11) obtained by mixing the correct sizes and weight percents of each size of particles (12). Inscribed within the cell walls are circles labeled (16), (17), and (18). These circles contain one size (16) of spherical particles (12), two sizes (17) of spherical particles (12), and, three or more sizes (18) of spherical particles (12), which are described as unimodal, bimodal, and tri or multimodal filling, respectively. For efficient filling, the particle sizes and weight percent of each size are related. Desirably, there are at least three different particle sizes in the mix for maximum packing density. The largest particle diameter is preferably seven times larger than the intermediate particle diameter, which itself is preferably seven times larger than the diameter of the smallest particle. A preferably size distribution is approximately 64.3 weight percent of the largest size particles, 26.5 weight percent of the mid-size particles, and 9.2 weight percent of the smallest size particles. Another factor that may be optimized is the maximum particle size. The measurements of the cell walls (10) in foams according to the present invention average 0.030 inches, which is over four times the size of the largest particle in fly ash.

The most desirable physical properties are obtained when the rigid, lightweight filled foam has a structure shown in the inscribed circle (18), which structure is a part of the present invention. This structure allows maximum filling, maximum beam strength, maximum number of closed cells and excellent economics for any non-directional filler or reinforcement particles. The particle structure described by inscribed circle (18) also eliminates any adverse effect on the properties of the foam due to the effects discussed above with regard to FIGS. 2A, 2B, 3A, and 3B.

Figure 5A:
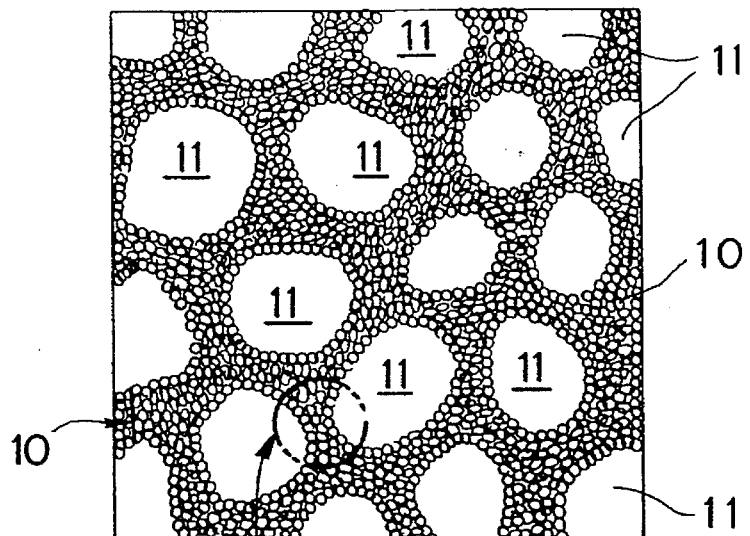
FIG. 5A is a fragmentary magnified sectional view of the foamed structure of the present invention.
Figure 5B:
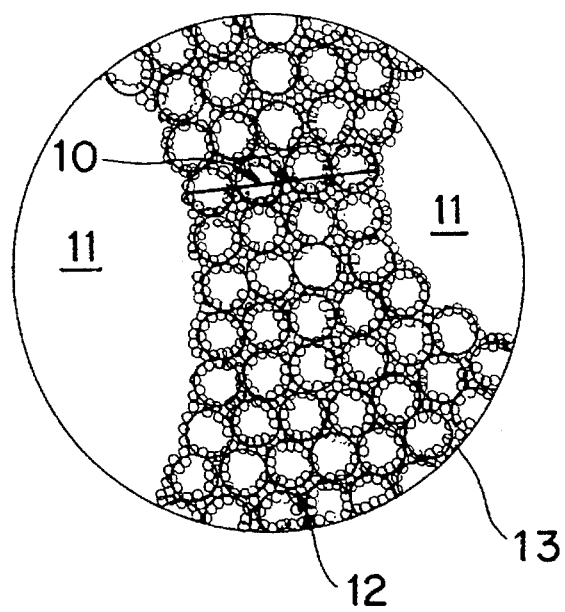
FIG. 5B is a highly magnified sectional view of a cell wall of the present invention.

FIGS. 5A and 5B illustrate a fragmentary sectional view of the current invention, and a highly magnified cross section of a cell wall (10). FIG. 5A shows the continuous cell wall structure (10) comprising the binder, with particles, and voids (11). FIG. 5B shows highly magnified voids (11), and particles (12) that exhibit multimodal packing in the cell wall (10) and the binder (13) which encapsulates each particle and forms the polymer glue for the complete structures.

Figure 5C:
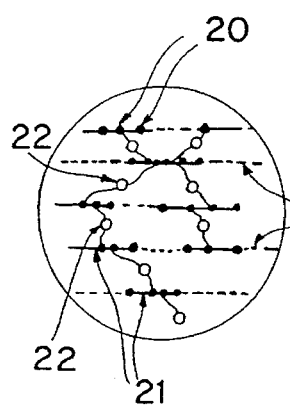
FIG. 5C is a schematic representation of the hybrid molecular structure of the present invention.
Figure 5D:
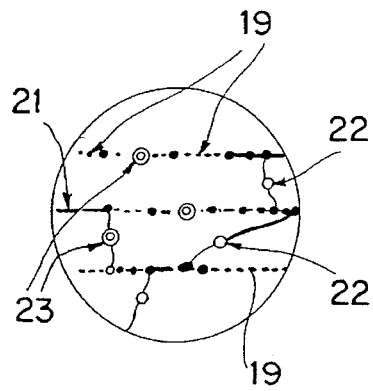
FIG. 5D is a schematic representation of a modified hybrid molecular structure of the present invention.
Figure 5E:
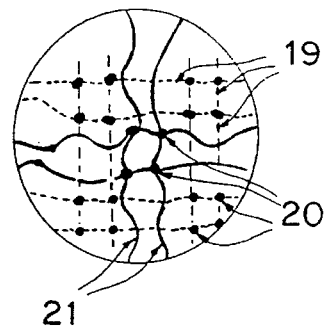
FIG. 5E is a schematic representation of an IPN structure of the present invention.

FIGS. 5C, 5D, and 5E are molecular schematics depicting general classes that the chemical structure takes in the current invention and represent a hybrid, modified hybrid, and an IPN (Interpenetrating Polymer Network) respectively. The hybrid structure of FIG. 5C contains unsaturated polyester (21) linked to polyurethane (19) by chemical bonds (20). The chains of unsaturated polyester polyol/polyurethane are then crosslinked by the catalyst initiated copolymerization of the polyurethane modified polyester polymer units and the styrene monomer (22). FIG. 5D shows one of the structures a reactive addition would produce. A reactive diol (23) could either chain extend or crosslink chains to produce a modified hybrid structure. FIG. 5D shows the hydroxyl containing material linked to urethane segments (19) in each case. FIG. 5E shows another structure that is produced. In this case there is no-chemical bonding between the strands of the urethane web (21). Each network contains molecular bonding (20) sites comprising both chain extension and crosslinking, and although the two networks are not bonded to each other, there is sufficient entanglement to prevent phase separation.

Figure 6:
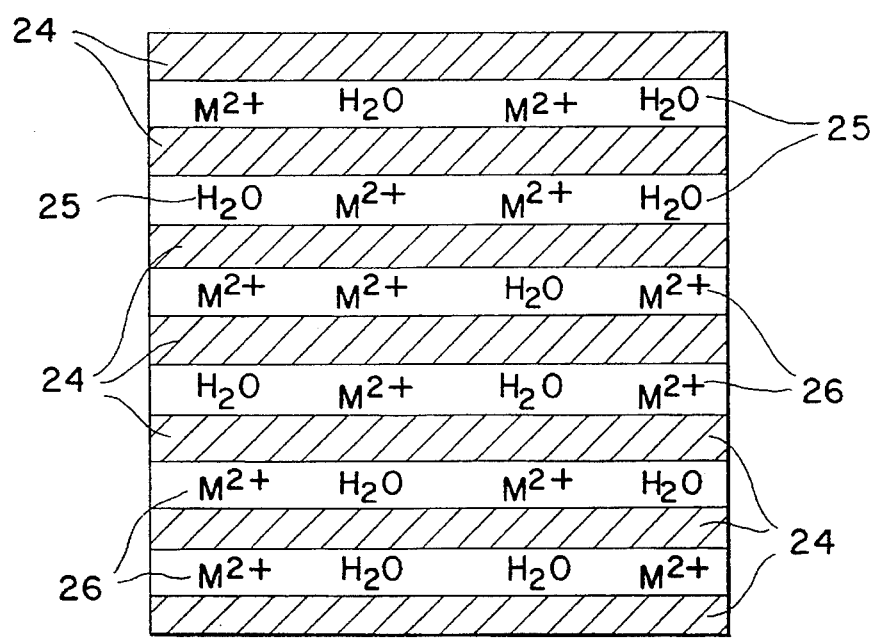
FIG. 6 is a fragmentary magnified schematic cross section of a clay structure of treated red mud.

FIG. 6 is highly magnified cross sectional schematic of a typical well crystallized clay found in processed red mud. Alternating layers (24) contain erosion products which are typically rounded and chemically contain oxides of silicon and aluminum. In the treated red mud used in the present invention, there are several varieties of clay, wherein the composition of layers (24) and the metal ions (26) in alternate layers differ, thereby holding the layers (24) together at different strengths and trapping the water (25) at various levels of structure bonding strength, which require a range of levels of heat energy to be applied to release water to the curing and foaming stages of the process for preparing the rigid, lightweight foams of the present invention.

The present invention relates to maximizing the properties of highly filled foamed thermosets. More specifically it relates to combinations of fillers, additives, and polymer chemistries that produce a highly filled foamed structure having excellent properties. These properties are the result of three innovative approaches to the design of a filled foam structure. The approaches are (1) correlating the type, relative sizes, and, weight percent of ,each size of reinforcing particle with geometric considerations, in the foam structure, thereby allowing the maximum filling rate in the cell walls without destroying the structural integrity of the wall; (2) efficiently using additives, which may accomplish two or more functions as part of the reinforcing particle additive, and blend chemistry system; and (3) using unique, state of the art, two-polymer chemistry techniques to form a complex binding agent for the reinforcing particles, thereby providing polymer strengthening mechanisms within the confines of the cell walls, and allowing an increase in processing flexibility not present in single polymer systems.

The typical mineral filler for thermoplastic and thermoset polymers is normally characterized as a chemically pure, homogeneous solid with a narrow particle size distribution. In contrast, the reinforcing particles used in the present invention may have diverse chemical compositions and should have a wide range of particle sizes.

The reinforcing particles used in the present invention may be any particles that will reinforce the cell walls of the foamed material, as more particularly described below, and which are capable of entraining a blowing agent, either through chemical or physical interactions, and of releasing the blowing agent during the foaming reaction, also more particularly described below. Desirably, the reinforcing particles possess, or are ground to possess, a particle size distribution similar to that of fly ash or treated red mud, i.e., of submicron to 200 microns, more particularly 0.1 to 100 microns.

These reinforcing particles may be selected from treated red mud, aluminum-hydrates, feldspars, clays, kaolinite, bentonite, beidellite, hydroxides, such as calcium hydroxide, or any particle having a particle size distribution similar to that of red mud, and capable of releasing water at various energy levels during the reaction forming the continuous phase matrix, as more particularly described below. Mixtures of these particles may also be used.

The reinforcing particles may also be selected from fly ash which has been preloaded with a blowing agent, diatomaceous earth, broken or cracked microballoons, broken or cracked microspheres, cenospheres separated from fly ash, Fullers earth, wood flour, cork dust, cotton flock, wool felt, shredded or finely powdered cornstalks, finely ground nut shells, and other fine size cellular materials having a particle size distribution similar to that of fly ash. Mixtures of these particles may also be used.

Particles such as diatomaceous earth, broken or crushed microballoons, broken or crushed microspheres, cenospheres separated from fly ash, Fullers earth, and wool felt should be preloaded with a blowing agent before reaction, as is done with fly ash. Particles such as wood flour, cork dust, cotton flock, shredded or finely powdered cornstalks, or finely ground nut shells already contain water entrained therein, and may be used as is, or after preloading with additional blowing agent.

Moreover, mixtures of particles from each of the above groups may be used. The reinforcing particles are desirably selected from the group consisting of treated red mud, preloaded fly ash, and mixtures thereof.

Fly ash is a very fine ash produced by the combustion of powdered coal with forced draft, which results in a mixture of alumina, silica, unburned carbon, and various metallic oxides. Fly ash can be described as heterogeneous fine powders consisting mostly of rounded or spherical particles of variable silica, alumina, and iron oxide content. The particle size range of the glassy spheres is in the range of submicron to 200 microns in diameter, more particularly 0.1 to 100 microns in diameter.

Typically, fly ash is a light brown, black or gray powder having no odor. The chemical composition of fly ash generally comprising in a major portion $SiO_2$, $Al_2O_3$ and $Fe_2O_3$, and in a minor portion $CaO$, $MgO$, $NaO$, $K_2O$, $SO_3$ and $TiO_2$.

Fly ash is generally available as a waste by-product of large-scale coal fueled power generation plants. In addition, fly ash is available from processes for gasifying coal. The chemical composition of fly ash is dependent upon the coal source, and the methods for burning the coal and collecting the fly ash. The properties of fly ash are a function of the composition of the coal, the particle size of the fly ash, and the temperature of combustion.

Fly ash of Types C and F may be preloaded with blowing agent to foam the continuous matrix, with Type F fly ash being preferred for the present invention. Type F fly ash contains a much higher percentage of hard particles (e.g., quartz, silicon dioxide, aluminum oxide, and iron oxide) than Type C fly ash, a distinction implicit in the definition of these types of fly ash. In addition, these types of fly ash contain compositional differences. Type C fly ash usually contains much higher amounts of magnesium oxide and calcium oxide than does Type F fly ash. As a result of these differences, some reinforcing capacity may be lost and chemical changes may occur with Type C fly ash to a degree not associated with Type F fly ash. These considerations will usually result in Type F fly ash being more desirable for use in the present invention.

Certain Type F fly ashes are more effective in the present invention. While not wishing to be bound by any theory, it is believed that the more effective Type F fly ashes lack a compound that chemically interacts with one or more of the reactions taking place in the polymer matrix of the continuous phase, thereby delaying or impairing certain crosslinking reactions related to the reactive monomer. The composition and physical properties of a particularly effective Type F fly ash are set forth below in Table 1.

TABLE 1

| Constituent | Composition, % |
| --- | --- |
| Silicon Dioxide, $SiO_2$ | 60.1 |
| Aluminum Oxide, $Al_2O_3$ | 28.9 |
| Iron Oxide, $Fe_2O_3$ | 3.4 |
| Titanium Dioxide, $TiO_2$ | 1.6 |
| Phosphorus Pentoxide, $P_2O_5$ | 0.10 |
| Calcium Oxide, CaO | 0.80 |
| Magnesium Oxide, MgO | 0.80 |
| Sodium Oxide, $Na_2O$ | 0.20 |
| Potassium Oxide, $K_2O$ | 2.60 |
| Sulfur Trioxide, $SO_3$ | 0.90 |
| Total | 99.6, | with 92.4% composed of silicon dioxide, aluminum oxide, and iron oxide. The physical properties of this Type F fly ash include 0.70% loss on ignition, and a pH of 5.5.

The fly ash component is generally employed in a proportion ranging from about 15 to 80 parts, preferably about 50 to about 60 parts, by weight per 100 parts by weight based on the total weight of the curable foamable composition.

The fly ash or red mud may be partially substituted by other fillers which include, but are not limited to, silicate, asbestos, calcium carbonate, mica, barytes, alumina, talc, carbon black, quartz, novaculite silica, garnet, saponite, calcium oxide, and mixtures thereof.

Red mud, or bauxite residue, comprises impurities, in the form of very fine particles, which are released from bauxite during the production of alumina by the Bayer process. Red mud is a very wet, alkaline, reddish brown heterogeneous substance which appears and feels like red clay. The red mud is comprised of various clays, which in turn may comprise silica, alumina, and minor amounts of other oxides. Red mud comprises layered structures of these oxides held together by other layers containing metal ions and combined water. In order for red mud to be useful in the present invention, both as a reinforcing particle and as a blowing agent source, the red mud must be treated. Said treatment comprises driving off free water at a prescribed temperature, and then pulverizing and screening the dried red mud. The end result is a multi-particle size red powder comprising a number of minerals, including clays and oxides, and entrained water.

The red mud component of the present invention is generally employed in a proportion ranging from about 15 to 80 parts, preferably about 50 to 60 parts, per 100 parts by weight based on the total weight of the curable foamable composition of the present invention.

In general, the rigid lightweight filled resin foams of the present invention may be foams that are predominantly open-cell, predominantly closed cell, or contain approximately equivalent amounts of open-cells and closed-cells. In general, larger and more angular particles, such as treated red mud, tend to rupture growing cell walls to a much greater extent than finer, more rounded particles, such as fly ash. Accordingly the type of cells can be controlled to a great extent by the selection of physical properties of the filler particles. Moreover, surfactant evaluation has shown that the material of the present invention behaves in a manner similar to that of other foamed polymers with respect to cell control. As a result, the nature of the cells of the product of the present invention can be varied by varying the chemical composition of the polymer phase and/or the foaming conditions in ways known to those skilled in this art, and/or by varying the physical characteristics of the filler particles.

As pointed out above, a mixture of fly ash and treated red mud may be used in the curable foamable composition of the present invention. The mixture is generally used in amounts of 15 to 85 parts, preferably 50 to 60 parts, by weight per 100 parts of the total composition. The relative proportions of these two components in the mixture may be varied in order to vary the reaction rate, and to help vary the relative proportions of open and closed cells.

The reinforcing particles may be supplemented by mineral fillers, chopped glass, chopped polymer fiber, directional or nondirectional glass fabrics, steel, finely ground powdered rubber, or the like. Mineral fillers and powdered rubber should be ground to a particle size distribution consistent with that of the reinforcing particles, such as the particle size distribution of fly ash or treated red mud.

The continuous phase of the rigid, lightweight filled resin foam according to the present invention forms the walls of the void spaces of the foam, and serves as a binder for the reinforcing particles discussed above. This continuous phase comprises at least an unsaturated polyester polyurethane hybrid resin, which forms a matrix comprising a complex cross-linked network. The polyester polyurethane hybrid resin is formed by reacting an unsaturated polyester polyol, a saturated polyol, a poly- or diisocyanate, and a reactive monomer, as shown in more detail below, and may be crosslinked with either said reactive monomer or said poly- or diisocyanate, or both. This reaction mixture may form additional networks which may become entangled or crosslinked with the polyester polyurethane hybrid network, and thus incorporated into the continuous phase network. As a result, the continuous phase may also comprise, as exemplary networks, polyurethane modified hybrid networks, or networks formed from polymerization products of reactive monomers, or networks formed from polymerization products of a saturated polyol with a poly or diisocyanate, or other networks that may form during the above-described reaction, or mixtures of any or all of these networks.

These networks may individually immobilize the reinforcing particles discussed above. Alternatively, when multiple networks are present they may be entangled, crosslinked together, or otherwise interact, further immobilizing the reinforcing particles. For example, the crosslinked polyester polyurethane hybrid resin network may form an interpenetrating polymer network, or IPN, with a second polyurethane network formed by the reaction of a diisocyanate or polyisocyanate with a saturated polyester polyol. Furthermore, the above-mentioned crosslinked hybrid resin may form a modified IPN with said second polyurethane network and with a third modified hybrid network formed by the reaction of a diisocyanate or polyisocyanate, an unsaturated polyester polyol, a saturated polyester polyol, and a reactive monomer.

As pointed out above, the polyester polyurethane hybrid resin network may be entangled with other polymer networks to form an interpenetrating polymer network, or IPN. An IPN is a material which consists of a pair or networks, at least one of which has been synthesized and/or crosslinked in the presence of the other. Interpenetrating polymer networks (IPN) are more or less intimate mixtures of two or more distinct crosslinked polymer networks that cannot be physically separated. IPN can be considered as another technique, very much like graft or block copolymerization, for inducing polymer blend compatibility through polymer structure modification. The possibility of combining various chemical types of polymeric networks has produced IPN compositions that exhibit synergistic behavior. If one polymer is elastomeric in nature and another is glassy, then a reinforced rubber is obtained if the elastomer phase predominates, and an impact-resistant plastic results if the glassy phase predominates.

There are several categories of interpenetrating polymer networks. When only one polymer is crosslinked and the other is linear the product is called a semi-IPN. Semi-IPN or semi-2-IPN exists when, respectively, polymer 1 or polymer 2 is the crosslinked component. Furthermore, in addition to IPN—the general term for interpenetrating polymer network—there can be distinguished the simultaneous interpenetrating network (SIN), wherein both polymers are synthesized simultaneously, by either addition or condensation polymerization reactions, and the interpenetrating elastomeric network (IEN). An IEN refers to those materials that are made by mixing and coagulating two different polymer latexes, and crosslinking the coagulum to form a three-dimensional structure. If the latex coagulum is not crosslinked, the resulting product is called a latex polyblend.

In the continuous phase of the present invention, although normally crosslinking is present within each phase, in areas where a true IPN exists, there is no polyurethane to polyester crosslinking. This area of the foam is called an IPN (interpenetrating polymer networks) structured composite. IPNs are formed when polymerization compositions are independently reacted to form distinct, intertwining, continuous polymeric chains. Chemically combining different types of polymeric networks results in the formation of resins having different properties. The IPN which is produced exhibits properties that are different from the individual constituent polymers.

As discussed above, an IPN may form in the foam of the present invention by the reaction of the unsaturated polyester polyol, which has hydroxy terminal groups, with a diisocyanate and/or polyisocyanate and a reactive monomer, which crosslinks the resulting polyester-polyurethane chain, and the independent reaction of a saturated polyester polyol with said diisocyanate and/or polyisocyanate to form a polyurethane. A modified hybrid IPN may also form in the foam of the present invention when, in addition to the above reactions, said diisocyanate and/or polyisocyanate forms an additional network by reaction with said unsaturated polyester polyol, said reactive monomer, and said saturated polyester polyol. This complex third network may intertwine with one or both of the other two networks. Other, more complex arrangements are also possible.

For example, crosslinking between networks may occur to various degrees, and usable structures may be formed from networks having minor degrees of crosslinking and significant entanglement, forming IPN-like structures in that the networks are entangled, but also contain some crosslinking. Usable structures may also be formed from networks that have an extremely high degree of crosslinking, e.g., between all of the polymer networks present. This is more likely to occur with hybrid resins containing high functionality polyisocyanates and saturated and unsaturated polyols having large numbers of hydroxyl sites.

Hybrid resins are well-known in the art, and hybrid polyester-polyurethane resins combine the best features of the polyester and polyurethane technologies. The resins are tougher than polyesters, and are stronger, stiffer and less costly than polyurethanes. Unsaturated polyester-polyurethanes contain double bonds which can react with styrene to form a strong, yet flexible solid.

Urethane hybrids are also versatile, and can be formulated for use in virtually any method of molding common to the unsaturated polyester and urethane industries. Equally important, they can be cured in a matter of seconds at room temperature or can be molded at elevated temperatures. They can be of low viscosity for ease of pumping or to embrace high levels of filler and reinforcement, or they can be thickened to flow only under high pressures and temperatures.

The weight percent range of polyurethane in the overall filled polyester/polyurethane structure should be between 10% and 60%. Below 10% the contribution of the urethane to the properties of the structure is minimal, and the ability to foam the material is considerably lessened. If the urethane percentage is over 60% some polyester crosslinking reactions may be hindered, and manufacturing consistency will be lost.

Unsaturated polyesters useful in forming the polyester polyol-polyurethane hybrid resin are typically prepared as the condensation reaction products of at least a di- or a polybasic acid, or an anhydride thereof, and a di- or polyhydric compound, wherein at least one of said acid or anhydride, or said di- or polyhydric compound contains ethylenic unsaturation. Optionally, flame retardant materials may be included as a reactant in the formation of said unsaturated polyester.

The unsaturated polyesters of the present invention are generally employed in a proportion ranging from about 20 to 80 parts, preferably 40 to 70 parts, per 100 parts by weight based on the total weight of the curable foamable composition, exclusive of the weight of reinforcing particles.

Typical di- or poly-basic acids or anhydrides thereof used in the preparation of the unsaturated polyesters include, but are not limited to, phthalic acids, iso- or terephthalic acid, adipic acid, succinic acid, sebacic acid, maleic acid, fumaric acid, citaconic acid, chloromaleic acid, allylsuccinic acid, itaconic acid, mesaconic acid, citric acid, pyromellitic acid, trimesic acid, tetrahydrophthalic acid, thiodiglycollic acid, and the like. These acids and anhydrides may be independently or jointly used.

Typical di- or polyhydric compounds used in the preparation of the unsaturated polyesters include, but are not limited to ethylene glycol, diethylene glycol, triethylene glycol, propylene glycol, dipropylene glycol, glycerol, 2-butyn-1,4-diol, neopentyl glycol, 1,2 -propanediol, pentaerythritol, mannitol, 1,6-hexanediol, 1,3-butylene glycol, 2-buten-1,4-diol, hydrogenated bisphenol A, bisphenoldioxyethyl ether, bisphenoldioxypropyl ether, neopentyl glycol and the like.

A variety of reactive monomers may be used. The reactive monomers may be mixed in with the polymeric components of the composition of the present invention in an amount sufficient to produce a thermoset product. In general, the proportions employed range from about 10 to 25 parts by weight, preferably 10 to 20 parts by weight per 100 parts by weight based on the total weight of the curable foamable composition exclusive of the weight of reinforcing particles. Specific examples include, but are not limited to, styrene, chlorostyrenes, methyl styrenes such as α-methyl styrene, p-methyl styrene, vinyl benzyl chloride, divinyl benzene, indene, allyl benzene unsaturated esters such as: methyl methacrylate, methyl acrylate and other lower aliphatic esters of acrylic and methacrylic acids, allyl acetate, vinyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate, amides such as acrylamides, vinyl chloride, and mixtures thereof. Among these examples, styrene is preferred.

The isocyanate component of the curable foamable composition of the present invention has a isocyanate functionality of two or more. The isocyanate component may thus be a diisocyanate or polyisocyanate. The diisocyanates or polyisocyanates of the present invention are generally employed in a proportion ranging from about 5 to 40 parts, preferably 15 to 20 parts by weight, per 100 parts by weight based on the total weight of the curable foamable composition exclusive of weight of reinforcing particles.

The diisocyanates or polyisocyanates include aliphatic, alicyclic and aromatic types. Representative examples include 2,4-tolylenediisocyanate, 2,6 -tolylenediisocyanate, 1,6-hexamethylenediisocyanate, 4,4' -diphenylmethanediisocyanate, 4,4'-diphenyletherdiisocyanate, m-phenylenediisocyanate, 1,5-naphthalenediisocyanate, biphenylenediisocyanate, 3,3'-dimethyl-4,4' -biphenylenediisocyanate, dicyclohexylmethane-4,4'-diisocyanate, p-xylylenediisocyanate, m-xylylenediisocyanate, bis(4-isocyanatophenyl) sulfone, isopropylidene bis(4-phenylisocyanate), tetramethylene diisocyanate, isophorone diisocyanate, ethylene diisocyanate, trimethylene diisocyanate, propylene-1,2 -diisocyanate, ethylidene diisocyanate, cyclopentylene-1,3 -diisocyanates, 1,2-,1,3- or 1,4-cyclohexylene diisocyanates, 1,3- or 1,4-phenylene diisocyanates, polymethylene polyphenyleneisocyanates, bis(4 -isocyanatophenyl)methane, 4,4'-diphenylpropane diisocyanates, bis(2-isocyanatoethyl) carbonate, 1-methyl-2,4-diisocyanatocyclohexane, chlorophenylenediisocyanates, triphenylmethane-4,4', 4"-triisocyanate, isopropyl benzene-α-4-diisocyanate, 5,6-diisocyanatobutylbicyclo[2.2.1]hept- 2-ene, hexahydrotolylene diisocyanate, 1-methoxyphenyl-2,4 -diisocyanate, 4,4',4"-triphenylmethane triisocyanate, polymethylene polyphenylisocyanate, tolylene-2,4,6 -triisocyanate, 4,4'-dimethyldiphenylmethane-2,2',5,5' -tetraisocyanate, and mixtures thereof.

The curable foamable composition of the-present invention may optionally contain di- or polyhydric compounds, capable of reacting with the isocyanate component to form polyurethanes.

The typical optionally contained di- or polyhydric compounds include ethylene glycol, diethylene glycol, triethylene glycol, propylene glycol, dipropylene glycol, glycerol, 2-butyn-1,4-diol, neopentyl glycol, 1,2 -propanediol, pentaerythritol, mannitol, 1,6-hexanediol, 1,3-butylene glycol, 2-buten-1,4-diol, hydrogenated bisphenol A, bisphenoldioxyethyl ether, bisphenoldioxypropyl ether, neopentyl glycol and the like and mixtures thereof.

Examples of curing catalyst include azo compounds such as azoisobutyronitrile, and organic peroxides, such as tertiary-butyl perbenzoate, tertiary butyl peroctoate, benzoyl peroxide, methyl ethyl ketone peroxide, acetoacetic peroxide, cumene hydroperoxide, cyclohexanone hydroperoxide, and dicumyl peroxide. Benzoyl peroxide is preferred. The catalyst is used in an amount of 0.03 to 2.5 parts by weight, preferably 0.5 to 1.0 parts by weight, per 100 parts by weight based on the total weight of the curable foamable composition, exclusive of the weight of reinforcing particles.

To accelerate the curing, a metal compound may be optionally added. Examples include cobalt naphthenate, cobalt octanoate, divalent acetylacetone cobalt, trivalent acetylacetone cobalt, potassium hexanoate, zirconium naphthenate, zirconium acetylacetonate, vanadium naphthenate, vanadium octanoate, vanadium acetylacetonate, lithium acetylacetonate and combinations thereof. Other accelerators include tertiary amines such as dimethylaniline, diethylaniline and dimethyl-p-toluidine.

Catalysts which promote the formation of urethane linkages by reaction of isocyanate groups and hydroxy groups include amine compounds, such as triethylenediamine, N-methylmorpholine, tetramethyl-1,4-butanediamine, N-methylpiperazine, dimethylethanolamine, diethylethanolamine, triethylamine, and the like; and organometallic compounds, such as stannous octanoate, dibutyltin dilaurate, dibutyltin di-2-ethylhexanoate, and the like. These may be used alone or in combination with one another. The catalyst can be used in a broad range of amounts, usually 0.03 to 2.0 parts by weight, preferably 0.02 to 1.0 parts by weight, per 100 parts by weight based on the total weight of the curable foamable composition, exclusive of the weight of reinforcing particles.

The foaming or blowing agent which may be optionally added to the curable foamable composition of the present invention includes water or a low-boiling volatile liquid. Examples of low-boiling volatile liquids are halogenated hydrocarbons which include trichloromonofluoromethane, dibromodifluoromethane, dichlorodifluoromethane, dichlorotetrafluoroethane, monochlorodifluoromethane, trifluoroethylbromide, dichloromethane, methylene chloride, and the like. These may be used alone or in combination with one another. Other conventional foaming or blowing agents are also within the scope of this invention.

Fire retardant raw materials may optionally be included as a reactant in the preparation of the unsaturated polyester polyol component, of the polyurethane component, or of both. Alternatively, these flame retardant raw materials may simply be physically mixed and become part of a dispersed ingredient in the composition of the present invention.

Fire retardant materials which may be used as reactants in the preparation of the unsaturated polyesters include tetrachlorophthalic anhydride, tetrabromophthalic anhydride, dibromotetrahydrophthalic anhydride, chlorendic acid, tetrabromobisphenol A, dibromoneopentyl glycol and the like. Said fire retardant materials are preferably contained in a proportion ranging from 5 to 40, preferably 15–20 parts by weight based on the total weight of the curable foamable composition, exclusive of the weight of the reinforcing particles.

The hybrid cured foam of the present invention may also contain non-reactive halogen-containing material in a proportion ranging from about 5 to 20 parts, preferably about 5 to 10 parts by weight, per 100 parts by weight based on the total weight of the curable foamable composition exclusive of the weight of reinforcing particles. These non-reactive halogen-containing materials include organic and/or inorganic materials. The organic materials include halogenated aliphatic, cycloaliphatic, cyclic and aromatic hydrocarbons. Illustrative are tetrachlorobutane, tetrabromobutane, hexabromoethane, chlorendic anhydride, tetrahalogenated phthalic anhydride, tetrabromocyclooctane, tetrachlorocyclooctane, hexachlorocyclopentadiene, hexabromocyclododecane, hexachlorocyclododecane, hexabromocyclohexane, pentabromotoluene, and the halogenated bi- and polyphenyl aromatic compounds. Halogenated polymeric materials are also useable. Inorganic materials include metal oxides, such as antimony oxides, iron oxides, copper oxides, titanium oxides and mixtures thereof. Illustrative examples include antimony trioxide, antimony tetraoxide, antimony pentoxide, ferric oxide, cupric oxide, titanium dioxide, etc.

Coupling agents, such as silanes or titanates, may also be included in the preparation of the rigid lightweight foams of the present invention to improve the physical properties of the foam by binding the hybrid resin more strongly to the reinforcing particles.

The present invention is additionally directed to methods for pretreating the various foamable composition components, methods for producing the foam, and methods for forming the foam into various structural shapes.

Prior to being included in the curable foamable formulation of the present invention, the filler particles are desirably subjected to a pretreatment process. Desirable pretreatments of the particles may comprise grinding to a particle size distribution consistent with that of fly ash or red mud, drying, as described below for red mud, or preloading, which may be carried out as a pretreatment step for particles like fly ash.

Commercially available red mud is dried for several hours at a temperature above the boiling point of water, preferably around 230° F., but under the maximum possible exotherm of the system. The dried product is then pulverized to reduce the average particle size, and screened, to reduce the variation in particle size. Particles having an average particle size of 200 microns or smaller are used.

The filling step does not appear to be time dependent, and the particular placement of the reinforcing particles in part depends on the type of metering, mixing, and dispensing equipment. In the simplest case, the filling step comprises calculating a specific weight of reinforcing particles based on the overall reactive polymer weight, to establish a weight percent range (anywhere from 10% to 85%) preferably 60%; adding the weighed particles to either the polyester polyol, diisocyanate or polyisocyanate, or both; totally wetting out all reinforcing particles by shear mixing, without inadvertently mixing the reactants; blending in any special purpose reactive additive, e.g., a reactive flame retardant polyol, a capped non-reactive polymer network to be further combined in an IPN, etc.; and finally allowing air bubbles, which have been mixed in, to escape from the two blends, so that massive instabilities are not present when the reactants are foamed. Reinforcing particles containing water as a blowing agent, or which are to be preloaded with a blowing agent reactive with isocyanates should not, in general be added to the isocyanate component, but should instead be premixed with the polyester polyol component.

Preloading of the reinforcing particles with blowing agent may occur either prior to of during the filling step. Prior preloading involves merely mixing the particles with blowing agent until the particles are at least partially wetted out, then adding the preloaded particles to the filling step. Preloading during the filling step involves, for example, adding the particles to the polyester polyol without mixing, adding blowing agent in proximity to the particles, and mixing. Prior preloading is desirable when the viscosity of the blowing agent is significantly greater than that of the polyester polyol or isocyanate.

Another important aspect of the reinforcing particles is that each allows the resin forming system sufficient time to foam. The reinforcing particles, because they either contain a blowing agent naturally or as a result of having been preloaded, release entrained water during the polyurethane reactions, thereby foaming the resin. With pure silica, or with thixotropic additions to thicken the reacting resins, it was not possible to foam this system with either water or Freon 11, formerly the industrial standard blowing agent.

Without being bound by any theory, it is believed that the reinforcing particles used in the present invention release water at different energy levels during the above-mentioned reaction by at least two mechanisms.

Particles like red mud and various clays contain combined water or other liquid which is bound at various levels of the particle structure, and with varying strength. This liquid functions as a blowing agent that is released from the particle over a range of energies during the foaming and curing reactions. The exothermic heat of reaction frees loosely bound liquid first. As the reactions progress, the urethane-forming exotherm causes the overall temperature of the mixture to rise; the foaming mass gets hotter, and more tightly held liquid is freed from the particles to the reaction. This progressive release with the increasing energy of the curing reaction provides blowing agent, and therefore foaming, throughout the course of the curing process. When the blowing agent is water, the particle acts as a reactant, a filler, and as a catalyst to speed up the curing reaction. The cure time of foams produced in accordance with the present invention is generally under four minutes.

Particles like fly ash require the addition of a small amount of blowing agent to preload the particulates with blowing agent which is then released slowly as the retarded curing reaction proceeds. While the release mechanism is not completely understood, it is believed that a variety of blowing agent release mechanisms may occur. For example, the blowing agent may combine with chemicals in the particle which can be released later (e.g., water may combine with oxides (CaO, MgO, $Na_2O$, $K_2O$, and possibly others) in fly ash to form a range of reactive hydroxides); the blowing agent may become trapped in the spongy, foamy cenospheres and later released by the curing reaction; the blowing agent may be adsorbed on diverse carbon particles present in the reinforcing particles, giving a usable release range; or the blowing agent release may be influenced by the presence of organic residues, polycyclic aromatic hydrocarbons (PAHs), or polynuclear aromatic hydrocarbons (PNAs). The release range of the blowing agent in the particles may be the result of two or more of these mechanisms. In any case, the addition of small amounts of blowing agent interacts with an organic or inorganic structure in the reinforcing particles in a manner that allows it to be released as required by the foaming and curing reaction in a manner similar to that of clays or red mud, as described above. The preloaded particle therefore serves at least two functions: entraining and releasing the blowing agent for foaming during the reaction, and reinforcing the continuous phase.

The mixing of the filled reactants is time dependent, and requires an efficient shear mixer to homogeneously blend the thickened, filled materials. As examples of mixing times, with treated red mud filled reactants, the mixing time available before the material begins to foam is approximately sixty seconds. Fly ash with added water gives a larger window of production flexibility, in that at least three or four minutes are available for the mixing step before the material is poured into a mold. In addition, the crosslinking reaction which occurs after the first sets of reactions forming urethane and urea can be delayed to the point where additional processing steps can be accomplished on the partially cured mass.

Economic benefits related to machine capacity and mold filling requirements result from using a filler system having relative amounts of either or both reinforcing particles that can be tailored to control curing rates. Specifically, smaller, less expensive metering, mixing, and dispensing equipment can be used to fill molds that would normally require larger machines due to a fixed, short reaction time after mixing.

As previously explained, it is difficult to foam a highly crosslinkable polyester material. The reasons relate to the loss of flexibility of the binder phase caused by polyester crosslinking, and to the generation of exothermic heat of reaction, which causes additional expansion, resulting in additional stresses against the binder wall. Three other reactions detrimental to foam generation are avoided by the use of fly ash and/or treated red mud as reinforcing particles. First, the reinforcing particles of the present invention are, for the most part, hard microspheres, not sharply pointed or angular particles. These reinforcing particles do not effectively raise the stress during the foaming process, and spread the stress during hardening over a greater portion of the binder, resulting in less tendency to rupture cell walls. Second, since there can be a wide range of spherical particle sizes, more efficient particle packing occurs in the binder walls. The packing in the cell walls is at least tri-modal, and even the largest particles usually have a diameter less than one-third of the cell wall thickness. This reduces the overall effect of the stresses on the binder walls caused by the shrinkage that occurs as the binder is curing. Third, the chemistries of the reinforcing particles, especially fly ash and treated red mud, allow foaming to occur over a long critical period, during which the binder structure is curing to the point where it has enough strength to maintain the void structure until binder hardening predominantly utilizing the polyester crosslinking reaction locks the structure into place.

The foaming process occurs in steps which are initiated as soon as the reactants are mixed. The first step is the exothermic urethane reaction. The heat generated begins to free the blowing agent associated with the reinforcing particles, for example the water associated with treated red mud or preloaded fly ash. The most loosely bound blowing agent, for example loosely bound water or free water, in the system reacts to form a transient carbamic acid and carbon dioxide. The carbamic acid yields an aniline derivative which further reacts with isocyanate groups to produce a urea linkage. This reaction is very exothermic, and provides the heat energy necessary to free more tightly bound blowing agent from the reinforcing particles.

The free radical initiated copolymerization of the reactive monomer and the unsaturated polyester polyol occurs after the foaming and urethane reactions are well underway. This crosslinking reaction significantly hardens the binder, and ideally occurs after the foaming reaction is complete. The crosslinking reaction is the final curing step and comprises reacting the ethylenically unsaturated groups of unsaturated polyester-polyurethane and the reactive monomer, which serves both as a diluent for the reaction system and as a curing agent.

The steps of foaming and prestabilizing the filled foam occur basically during polyurethane (and polyurea) formation, which are among the first set of reactions resulting from the reaction of the diisocyanate or polyisocyanate with the unsaturated polyester polyol and released water.

The present invention is now described in more detail by referring to the following Examples and Comparative Examples, which however should not be construed to be limiting the scope of the present invention.

The hybrid materials used for the examples were part of the two component hybrid system of unsaturated polyester/ polyurethane manufactured by Cook Components and Polymers (Freeman Division). There are three basic materials that are currently produced for resin transfer molding that make up the Interpol systems. These three basic materials each designated by two numbers are as follows: 35-5116/ 35-5205, 35-5118/35-5205; and 35-5124/355205.

The component common to all three systems is designated Interpol 35-5205. This is a medium functionality MDI Isocyanate. The NCO content of this polymethylene polyphenyl isocyanate is 32 percent. Prior to mixing, a blend is made between the Interpol 5205 and Interpol 31-0070. Interpol 31-0070 is a 50/50 weight percent blend of benzoyl peroxide catalyst and an inert material, tricresyl phosphate, which is included for safety reasons.

The designations 35-5116, 35-5118, and 35-5124 refer to materials that generate a more urethane acting cured material. This is accomplished by adding higher levels of saturated polyester polyol which is compatible with the unsaturated polyester polyol containing hydroxyl terminations. The resin solution is approximately 75 percent solids and 25 percent styrene monomer. In general, as the amount of saturated polyester polyol decreases, the amount of styrene increases, as does the crosslink density. In addition, since the amount of Interpol 5205 is always 27/129 of the total mix, the hydroxyl number of the diluted solutions must be constant for 35-5116, 35-5118, and 35-5124. This implies the hydroxyl number of the saturated polyol is equivalent to the hydroxyl number of the unsaturated polyester polyol with hydroxyl terminations.

Specifically, Interpol 35-5118 contains an unsaturated polyester polyol with hydroxyl terminations, approximately 25 weight percent styrene, standard organometallic catalysts for the urethane reaction, and a tertiary amine promoter; other chemicals used in the examples include PHT4-DIOL, a tetrabromophthalic anhydride diol which can be used as a flame retardant and which can be foamed. It can also be foamed independent of the filled hybrid foaming process. Other compounds, including surfactants, e.g. LF443, produced by Air Products, reactive liquids containing flame retardants, and colorants may be included in the examples to provide established functions.

One of the main components of the Interpol system hybrid is formed by the production of an unsaturated polyester polyol containing hydroxyl sites and reaction thereof with styrene monomer and diphenylmethane diisocyanate in the presence of a benzoyl peroxide catalyst. The end product of this reaction is a polymer hybrid containing approximately thirty percent polyurethane and seventy percent polyester. The polyurethane reaction occurs first, and is followed by the free radical initiated crosslinking of the unsaturated polyester polyol with the styrene monomer. The sequence of the reactions is important to the foaming reaction.

EXAMPLE 1

In vessel 1, 775 grams of an unsaturated polyester polyol composition ("Interpol 5118", Cook Composites and Chemicals, Inc.) were blended with 428 grams of treated red mud. In vessel 2, 209 grams of an isocyanate compositions ("Interpol 5205", Cook Chemicals and Composites) were blended with 15 grams of benzoyl peroxide paste. The contents of vessel 2 were added to vessel 1 and thoroughly mixed. The curing reaction was accelerated, a foam of homogeneous small bubbles was produced having a foam density of 31 pounds per cubic foot, and a very lightweight filler unsaturated polyester polyol/polyurethane hybrid foam was produced.

EXAMPLE 2

In vessel 1, 775 grams of an unsaturated polyester polyol composition (Interpol 5118) were blended with 1222 grams of treated red mud and 2 grams of water. In vessel 2 209 grams of an isocyanate composition (Interpol 5205) were blended with 15 grams of benzoyl peroxide paste. The contents of vessel 2 were added to vessel 1 and thoroughly mixed. The curing reaction was further accelerated, and a foam of homogeneous small bubbles was produced with a foam density of 40 pounds per cubic foot. On curing, a very lightweight filled unsaturated polyester/polyurethane hybrid foam was produced.

EXAMPLE 3

In vessel 1, 625 grams of an unsaturated polyester polyol composition (Interpol 5118) were blended with 977 grams of Type F fly ash, 6 grams of water, and 2 grams of LK443 surfactant. In vessel 2, 168 grams of an isocyanate composition (Interpol 5205) were blended with 12.5 grams of benzoyl peroxide paste. The contents of vessel 2 were added to vessel 1 and thoroughly mixed. The curing reaction was significantly retarded, and a foam of homogenous small bubbles was produced with a foam density of 38 pounds per cubic foot, and a highly filled unsaturated polyester/polyurethane hybrid foam resulted.

EXAMPLE 4

In vessel 1, 1705 grams of an unsaturated polyester polyol composition (Interpol 5118) were blended with 2688 grams of treated red mud and 18 grams of water. In vessel 2, 460 grams of an isocyanate composition (Interpol 5205) were blended with 44 grams of benzoyl paste. Entrapped air was allowed to escape for five minutes from each blend. The contents of vessel 2 were added to vessel 1 and thoroughly mixed. The mixture was poured into a mold constructed to make a tee beam that can be evaluated according to ATM C78 for flexure testing concrete by the third-point loading method.

The material produced a foam of homogenous small bubbles, having a density of 54 pounds per cubic foot, and a lightweight foamed unsaturated polyester/polyurethane hybrid structure in the form of a tee beam twenty inches long resulted. Further, when the beam was tested by a qualified outside testing laboratory to ASTM C78 specification, the very surprising result that the beam failed under an applied load of 9350 pounds, which equates to a compressive strength of 6545 pounds per square inch and a tensile strength of 2805 pounds per square inch, was obtained.

EXAMPLE 5

In vessel 1, 1162 grams of an unsaturated polyester polyol composition (Interpol 5118) were blended with 1833 grams of treated red mud, and 6 grams of water. In vessel 2, 314 grams of an isocyanate composition (Interpol 5205) were blended with 23 grams of benzoyl peroxide paste. Entrapped air was allowed to escape for five minutes. The contents of vessel 2 were added to vessel 1 and thoroughly mixed. The mixture was poured into a mold constructed to make a tee beam that can be evaluated according to ASTM C78 procedures for flexure testing concrete by the third point loading method.

The material produced a foam of homogeneous small bubbles, having a density of 31 pounds per cubic foot and a filled lightweight foamed unsaturated polyester polyol/polyurethane hybrid structure in the form of a tee beam twenty inches long resulted. Further, when the beam was tested by a qualified outside testing laboratory to ASTM C78 specification, the surprising result that the beam failed under an applied load of 3850 pounds which equates to a compressive strength of 2695 pounds per square inch and a tensile strength of 1155 pounds per square inch, was obtained.

EXAMPLE 6

In vessel 1, 1162 grams of an unsaturated polyester polyol composition (Interpol 5118) were blended with 1833 grams of Type F fly ash and 20 grams of water. In vessel 2, 314 grams of an isocyanate composition (Interpol 5205) were blended with 23 grams of benzoyl peroxide paste. Entrapped air was allowed to escape for five minutes. The contents of vessel 2 was added to vessel 1 and thoroughly mixed. The mixture was poured into a mold constructed to make a tee beam that can be evaluated according to ASTM C78 procedure for flexure testing concrete by the third point loading method.

The mixed material produced a foam of homogeneous small bubbles. The foam had a density of 32 pounds per cubic foot and a filled lightweight foamed unsaturated polyester polyol/polyurethane hybrid structure in the form of a tee beam twenty inches long resulted. Further, when the tee beam was tested by a qualified outside testing laboratory to ASTM C78 specification the surprising result that the beam failed under an applied load of 3750 pounds, which equates to a compressive stress of 2625 pounds per square inch and a tensile stress of 1125 pounds per square inch, occurred.

EXAMPLE 7

In vessel 1, 1162 grams of an unsaturated polyester polyol composition (Interpol 5118) were blended with 1833 grams of Type F fly ash, and 11.3 grams of water. In vessel 2, 314 grams of an isocyanate composition (Interpol 5205) were blended with 23 grams of benzoyl peroxide paste. Entrapped air was allowed to escape for five minutes. The contents of vessel 2 were added to vessel 1 and thoroughly mixed. The mixture was poured into a mold constructed to make a tee beam that can be evaluated according to ASTM C78 procedures for flexure testing concrete by the third point loading method.

The mixed material produced a foam of homogeneous small bubbles. The foam had a density of 37 pounds per cubic foot and a filled lightweight foamed unsaturated polyester polyol/polyurethane structure in the form of a tee beam twenty inches long resulted. Further, when the tee beam was tested by a qualified outside testing laboratory to ASTM C78 specification, the surprising result that the beam failed under an applied load of 4400 pounds, which equates to a compressive strength of 3080 pounds per cubic inch and a tensile strength of 1320 pounds per cubic inch, occurred.

EXAMPLE 8

In vessel 1, 100 grams of a flame retardant diol (PHT4-DIOL) were blended with 1 gram of water. Vessel 2 contained 50.3 grams of an isocyanate composition (Interpol 5205). The total contents of vessel 2 were added to vessel 1 and thoroughly mixed. A polyurethane, polyurea foam was produced.

EXAMPLE 9

In vessel 1 581 grams of an unsaturated polyester polyol composition (Interpol 5118) were blended with 112 grams of a flame retardant diol (PHT4-DIOL) and 1108 grams of treated red mud. In vessel 2, 213 grams of an isocyanate composition (Interpol 5205) were blended with 11.6 grams of benzoyl peroxide paste. The contents of vessel 2 were added to vessel 1 and thoroughly mixed. The mixed material produced a foam of homogeneous small bubbles, having a density of 31 pounds per cubic foot and a filled light weight structure of a foamed, unsaturated polyester polyol/polyurethane hybrid modification was produced. It is believed that reactive diol addition modified the chain extension and crosslinking of the hybrid, thereby making the hybrid structure more complex, or that this addition results in the formation of a polyurea/polyurethane network instead of crosslinking to the hybrid, thus forming an IPN structure, or that the addition provides an unknown percentage of both the modified hybrid or IPN structure. The end result is that flame retardant contained within the PHT4-DIOL is locked in place by either molecular bonding, chain entanglement, or both, and cannot migrate to the voids and bleed out over time. In addition, the added material provides an additional segment or dispersed phase for strengthening.

EXAMPLE 10

A series of filled hybrid foams were made using conventional meter, mixing, and dispensing equipment, containing two feed vessels or tanks. The first tank contained 11 lbs. of Interpol 035-5118, 11 lbs. of Interpol 035-5124, 2.2 lbs. of Great Lakes PHT-4DIOL, 1.35 lbs. of Air Products DC 193 surfactant, 50 lbs. of Type F fly ash, 0.5 oz. of UL 33 catalyst, and 7 oz. of water. The second tank contained 16 lbs. of 035-5205 (polyisocyanate) and 1 lb. of 031-0070 (benzoyl peroxide in an equal amount by weight of tricresyl phosphate). These two mixtures of material were pumped to a mix head, mixed, and dispensed into various molds. The foamed parts were postcured for 2 hours at 220° F.

From one plate were cut two samples 1 in.×1 in.×0.5 in. (thickness). One of the samples had four exposed cut sides, and had a dry weight of 5.85 grams. The second sample was sanded on its two skin sides to give 6 exposed foam surfaces, thereby approximating a core structure. This sample weighed 5.4 grams.

Both samples were immersed in water by weighting to the bottom of a container (weighting was necessary because the density of the samples was 55 pcf). A vacuum was applied to the samples for 20 minutes. The samples were then removed from the water, surface dried, and weighed again. The weight of the first and second samples after this water treatment was 5.9 grams and 5.52 grams, respectively. The weight of water drawn into the sample by the vacuum, divided by the weight of the sample with water was at least 98%, indicating that the foams contain well over 90% closed cells.

COMPARATIVE EXAMPLE 1

In vessel 1, 775 gams of an unsaturated polyester polyol composition (Interpol 5118) were blended with two grams of water. In vessel 2 209 grams of an isocyanate composition (Interpol 5205) were blended with fifteen grams of benzoyl peroxide paste. The contents of vessel 1 were added to vessel 2 and thoroughly mixed. The curing reaction was retarded, and some bubbles were released to the surface. No foam was produced, but a polyurethane/unsaturated polyester hybrid solid was obtained.

COMPARATIVE EXAMPLE 2

In vessel 1, 542 grams of an unsaturated polyester polyol composition (Interpol 5118) were blended with 15 grams of Freon 11, and two grams of LK443 surfactant. In vessel 2 146 grams of an isocyanate composition (Interpol 5205) were blended with 10.9 grams of benzoyl peroxide paste. The contents of vessel 1 were added to vessel 2 and thoroughly mixed. The curing reaction was not effected, and some bubbles were released to the surface. No foam was produced, but a polyurethane/unsaturated polyester hybrid solid resulted.

COMPARATIVE EXAMPLE 3

In vessel 1, 775 grams of an unsaturated polyester polyol composition (Interpol 5118) were blended with 500 grams of ultra fine sand (particle diameters equivalent to the particle size of fly ash or treated red mud of the present invention) and 2 grams of water. In vessel 2, 209 grams of an isocyanate composition (Interpol 5205) were blended with 15 grams of benzoyl peroxide paste. The contents of vessel 2 were added to vessel 1 and thoroughly mixed. The viscosity of the mixture was greater than that of example 4 but slightly less than that of example 5. Some bubbles were released to the surface, but no foam was produced, and an unsaturated polyester/polyurethane hybrid solid was produced.

The foamed products of the present invention may be used, e.g., as building materials, e.g., as lightweight roofing materials (e.g., slates or tiles), as decorative or architectural products, as outdoor products, as low cost insulation panels, as fencing, as lightweight buoyant or corrosion-resistant marine products, etc., by forming the foamed resin in a mold of suitable size and shape, and then using the molded product in an art-recognized way.

Moreover, the foamed products of the present invention may be used as a lightweight, foamed insert, optionally having a partially embedded random mat glass structure, in subsequent casting operations to produce a low cost, high strength composite structure.

What is claimed is:

1. A process for producing the rigid, lightweight filled resin foam comprising:

(a) a continuous phase having cellular voids therein, wherein said continuous phase comprises a matrix formed from a complex crosslinked network comprising an unsaturated polyester polyurethane resin which is the reaction product of an unsaturated polyester polyol, a saturated polyol, a poly- or diisocyanate, and a reactive monomer, and optionally further comprising:
        (i) polyurethane modified hybrid networks;
        (ii) networks of polymerization products of reactive monomers;
        (iii) networks of polymerization products of saturated polyester polyol and poly- or diisocyanates;
        (iv) other networks that may form during the formation of the polyester polyurethane resin; or
        (v) mixtures of the above networks; and
    (b) fine multisize reinforcing particles dispersed in said matrix of said continuous phase, wherein the diameter of the largest of said multisize particles is no greater than about 33% of the average thickness of said walls between said cellular voids, and wherein at least a portion of said multisize particles are capable of containing and releasing a blowing agent during the formation of said polyester polyurethane resin;

comprising the steps of:

(A) forming a reaction mixture, comprising mixing unsaturated polyester polyol having hydroxy terminations, a diisocyanate or polyisocyanate, a saturated polyol, a reactive monomer, and a free radical initiator, with fine multisize reinforcing particles, at least a portion of which contain a blowing agent and are capable of releasing said blowing agent to the reaction mixture;

(B) reacting, but not appreciably crosslinking, said reaction mixture;

(C) simultaneously with said reaction, foaming said reaction mixture in the presence of said blowing agent, to form a ductile, lightweight filled resin foam, wherein said blowing agent is released into the reaction system from said fine multisize reinforcing particles; and (D) hardening said ductile lightweight filled resin foam either immediately, or at a future time, by crosslinking to a rigid filled foam.

2. The process according to claim 1, wherein said saturated polyol is a saturated polyester polyol.

3. The process according to claim 1, wherein said step (A) further comprises mixing an organic diol or polyol into said reaction mixture.

4. The process according to claim 1, wherein said blowing agent is selected from the group consisting of water, trichloromono-fluoromethane, dibromodifluoromethane, dichlorodifluoro-methane, dichlorotetrafluoroethane, monochlorodifluoro-methane, trifluoroethylbromide, dichloromethane, methylene chloride, and mixtures thereof.

5. The process according to claim 1, wherein said blowing agent comprises water.

* * * * *